May 3, 1932. J. L. GRIMME 1,856,869

ELECTRIC DENTAL LATHE

Filed Sept. 28, 1929 3 Sheets-Sheet 1

Inventor:
Jorge Luis Grimme
by Emery, Booth, Varney & Townsend
Attys

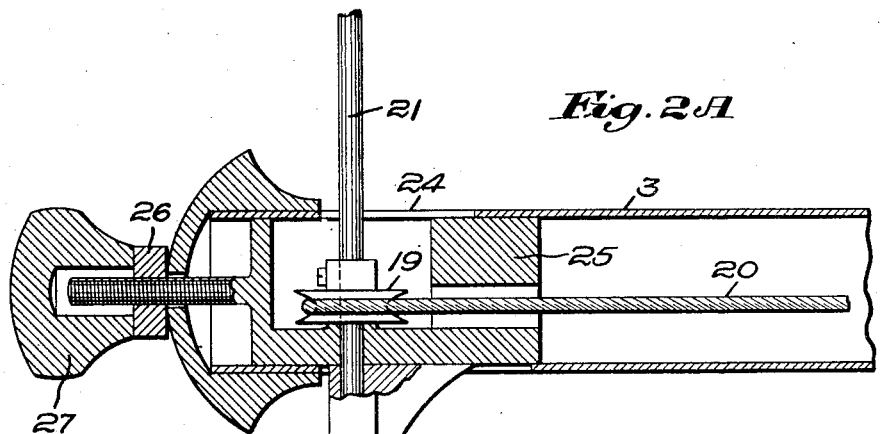
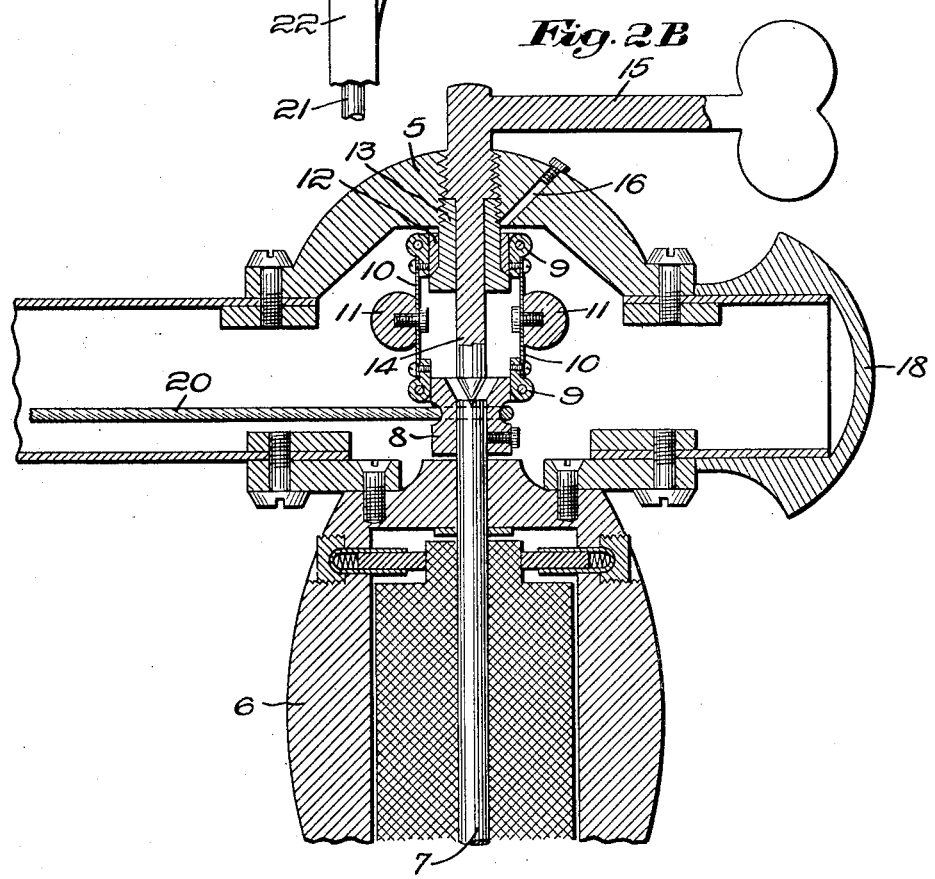

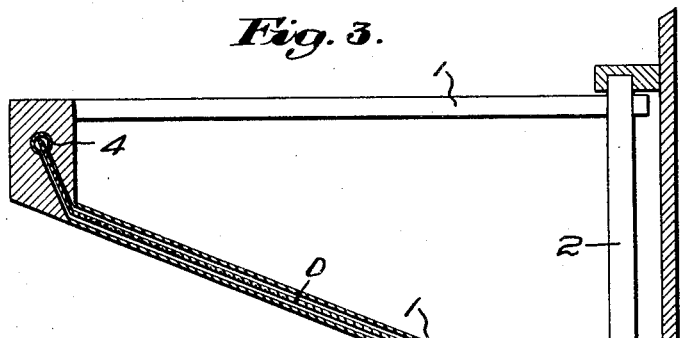
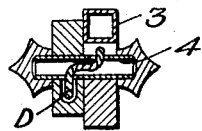
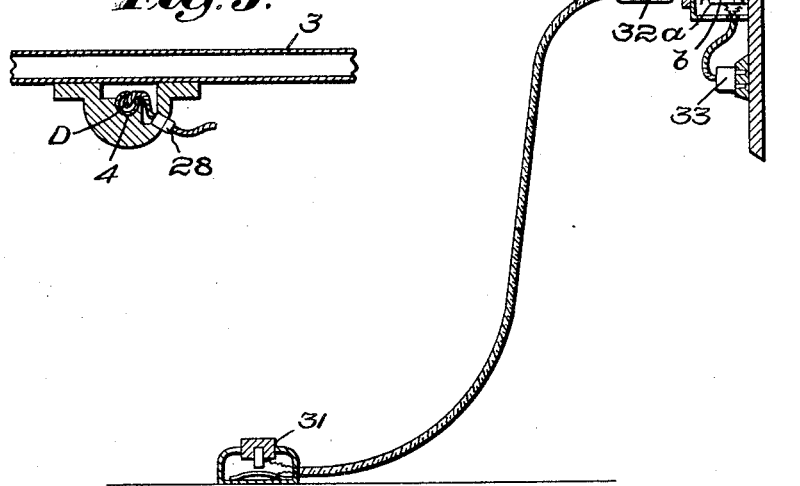

Patented May 3, 1932

1,856,869

UNITED STATES PATENT OFFICE

JORGE LUIS GRIMME, OF BUENOS AIRES, ARGENTINA

ELECTRIC DENTAL LATHE

Application filed September 28, 1929. Serial No. 395,947.

My invention concerns an electric lathe for direct or alternating current, destined for the various operations which occur in clinics and dental laboratories.

As will be seen further on, the new electric dental lathe combines various elements in a novel manner to simplify the operation of the apparatus, reducing its weight and size, regulating at will the speed of the instruments, reducing their cost and facilitating dismounting for transport or eventual repairs, all this without detracting from its pleasing appearance or utility.

The lathe of the present invention can be constructed to be fixed to the wall or mounted upon a portable support.

In the accompanying drawings, wherein I have shown merely for illustrative purposes one embodiment of my invention, Fig. 1 shows in side elevation a dental lathe, the components of which are constructed and combined in accordance with my invention;

Fig. 2A is a detail section showing portions of the power transmitting means;

Fig. 2B is a detail view of the motor and associated parts;

Fig. 3 is a vertical section through the center of the lathe arm illustrating the resistance and interruptors for the wiring system thereof;

Fig. 4 is a detail transverse section on the line 4—4 of Fig. 1; and

Fig. 5 is a detail vertical section through the center of the motor 6.

Figure 1:
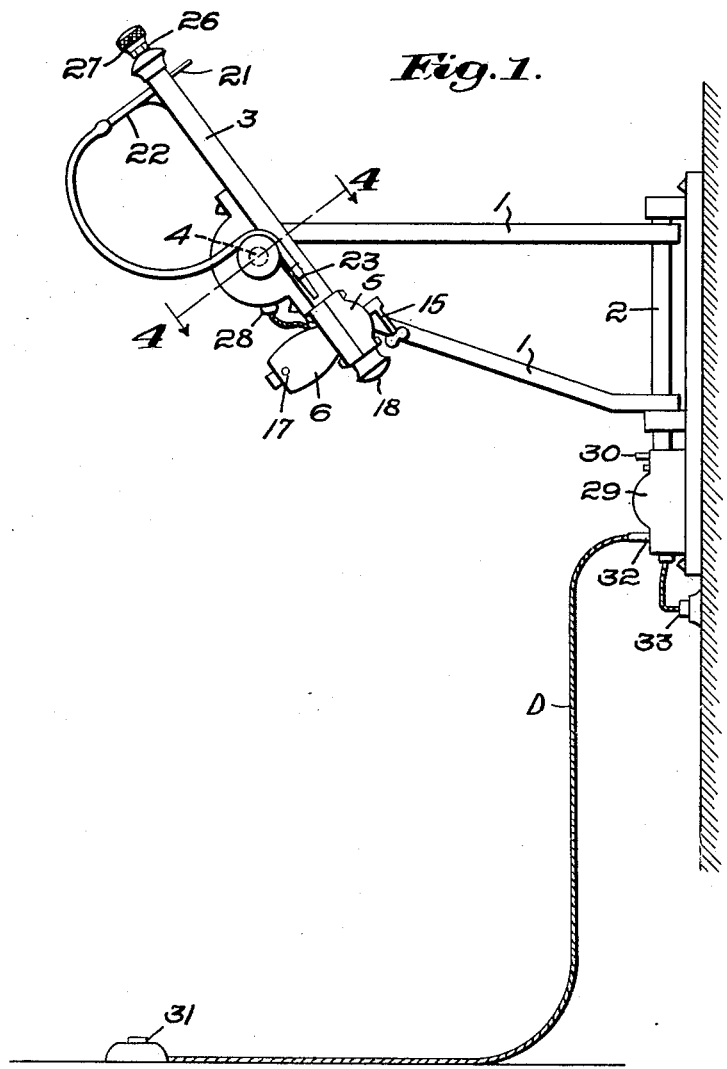

In the drawings, 1 is a bracket or support which is pivoted upon a pin 2 to be swung as required, and carries at its end a hollow arm 3 mounted so that, by turning upon its horizontal pivot shaft 4, it can be brought into different inclinations.

At the lower end of the hollow arm 3 is fixed a chamber 5 and in this an electric motor 6 for direct and alternating current. The driving axle 7, after passing through its immediate bearing, passes to the interior of the chamber 5 to actuate a pulley 8 united to a regulator or centrifugal governor composed of articulated members 9 united with the springs 10 to which centrifugal weights 11 are secured. The governor operates in connection with a brake composed for example of a brake ring 12, connected with the upper member 9, the lower edge of which will remain attached to the conical part of the friction bell 13 enclosed firmly in the chamber 5. Through said bell passes a pin 14 which can be adjusted by a screw thread at the upper part of the chamber 5, through which it protrudes, to form an outstanding arm 15 which constitutes a speed regulating lever. An orifice 16 with corresponding cover provides for the lubrication of the system.

The pin 14 has a conical end which enters a central recess in the end of the driving axle to effect an axial displacement of the point at which the friction between the ring 12 and the bell 13 produces the extension of the spring 10 and the retardation of the motion which can be graduated at will. For this purpose the motor has been constructed so that its axle can effect the slight displacement necessary for the proper operation of the governor. The button 17 of the motor controls the reversing of the motor. The end of the hollow arm 3 at which the governor is located is covered by a cap 18 which, when removed, permits inspection of this assembly. The pulley 8 actuates a pulley 19 by means of a belt 20 which revolves about the interior of the hollow arm 3 and transmits increasing or diminishing speeds from the pulley 8 to the pulley 19.

The pulley 19 is secured to a shaft 21 which through a flexible transmission, disposed in the interior of the lathe tube or arm 22, actuates the chuck 23 to which various forms of instruments are attached. The shaft 21, as shown most clearly in Fig. 2A, projects through an elongated opening 24 formed in the hollow arm 3 so as to provide the adjustments required for varying the tension of the belt 20 and for this purpose the pulley 19 and the shaft 21 are mounted upon the movable guide 25. This plays in the interior of the hollow arm 3 and in addition to an opening for the passage of the belt said guide has at the other end a screw which passes through the end of the hollow arm and at which place is actuated by the nut 26 attached to the handle 27 by means of which the guide 25 may be moved to tighten said belt 20 more or less.

The electric conductors, as shown in diagrammatic form in Fig. 3, represents a cable D of two conductors which are separated one from the other, one for going and the other one for return of the electric current. The fine lines $d$ represented single conductors only. The conductors D are installed through the interior of the arms of the bracket 1 and connected to the motor by means of a plug 28. The installation is completed by a fixed resistance 29 in combination with the hand interruptor button 30 and with the foot interruptor 31 which are inserted in the circuit by means of a plug 32. The device is connected to the lighting line by means of the plug or key 33.

The horizontal pivot for the hollow arm 3 is shown at 4, Figs. 3, 4 and 5, and allows for the vertical movements of the motor 6.

To start the apparatus in operation the circuit is closed by pressing the button 30 thus putting the device in readiness to start upon pressing of the button 31 of the foot interruptor. When it is desired to eliminate the pressing of the button 31 using only the hand interruptor it will be sufficient to withdraw the plug 32 so that the groove $b$, Fig. 3, touches the conductor plate $a$, and the circuit will be closed at $c$ through the proximity of the upper plate which is flexible with downward pressure.

The operation of the apparatus is as follows: Once the motor is started, either by the foot interruptor 31, or by the hand button 30, following the regulation of the resistance, which is done during the installation of the apparatus, the compensation weights 11 of the centrifugal governor tend to separate, thereby overcoming the resistance of the springs 10, which then reaches a speed determined by the friction between the ring 12 and the bell 13 produced by the centrifugal effort of the compensation weights. It is obvious that, when by the action of the lever 15, which exercises at will a pressure upon the point of the shaft, said friction is increased, the speed will be reduced, but the speed cannot be less than a selected one, because the brake action ceases at the moment it is desired to reduce the speed of the centrifugal governor through the extension of the springs which is effected by overcoming the tendency of the compensator weights to separate.

Although the device shown is designed to be fixed to the wall, it may also be made portable, as for example by attaching the pin 2 to the upper part of a column or foot not shown.

The invention is not limited to the embodiment shown.

Claims:

1. An electric dental lathe comprising in combination, an oscillating supporting member, a hollow arm angularly adjustable upon said member, an electric motor carried by one end of said hollow arm, a shaft carried by the other end of said arm, power transmission means within said arm and connecting said motor to said shaft, and a speed regulator within said arm and connected to said motor.

2. An electric dental lathe comprising in combination a supporting member, a hollow arm angularly adjustable upon said supporting member, an electric motor, power transmission means including a belt driven by said motor and operatively connected therewith through said hollow arm, a centrifugal governor connected to said motor and mounted within said hollow arm, and a lever supported by said arm for regulating the speed of said governor.

3. In a dental lathe a hollow angularly adjustable arm, an electric motor carried by said arm, a chuck, means to transmit motion from said motor to said chuck including a driving pulley mounted in said hollow arm and driven by said motor, a second pulley mounted in said hollow arm at a distance from said driving pulley, speed regulating means connected with said driving pulley, a belt connecting said driving and driven pulley within said arm, and means also within said arm for regulating the tension of said belt.

4. In a dental lathe, a bracket, a tubular arm pivotally movable on said bracket to different angular positions, an electric motor supported by said arm, a driving pulley operated by said motor and disposed within said arm, a driven pulley within and adjustable longitudinally of said arm relatively to said driving pulley, a belt connecting said pulleys, a governor connected to said motor and disposed within said arm, and means protruding from said arm to regulate said governor.

5. In a dental lathe, a hollow transmission arm arranged to be swung to varying angular positions, driving and driven pulleys rotatably arranged at opposite ends of said arm, a belt connecting said pulleys, means operative from the exterior of one end of said arm adjacent to said driven pulley to vary the tension of said belt, and regulating means connected to said driving pulley and operable from the other end of said arm to regulate the speed of said driving pulley.

6. In a dental lathe, a hollow transmission arm arranged to be swung to varying angular positions, driving and driven pulleys rotatably arranged at opposite ends of said arm, a belt connecting said pulleys, means operative from the exterior of one end of said arm adjacent to said driven pulley to vary the tension of said belt, regulating means connected to said driving pulley and operable from the other end of said arm to regulate the speed of said driving pulley, and a removable cap at said other end for permitting access to said regulating means.

In testimony whereof I have signed my name to this specification.

JORGE LUIS GRIMME.